United States Patent
Shen et al.

(10) Patent No.: US 8,055,771 B2
(45) Date of Patent: Nov. 8, 2011

(54) NETWORK TRAVERSAL METHOD FOR ESTABLISHING CONNECTION BETWEEN TWO ENDPOINTS AND NETWORK COMMUNICATION SYSTEM

(75) Inventors: I-Tsung Shen, Hsinchu (TW); Yung-Sheng He, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/604,403

(22) Filed: Oct. 23, 2009

(65) Prior Publication Data
US 2011/0055392 A1   Mar. 3, 2011

(30) Foreign Application Priority Data
Sep. 2, 2009  (TW) .............................. 98129547 A

(51) Int. Cl.
G06F 15/16 (2006.01)
G06F 15/173 (2006.01)
G06F 15/177 (2006.01)

(52) U.S. Cl. ........ 709/225; 370/352; 370/389; 370/401; 370/259

(58) Field of Classification Search .......... 709/217–228; 370/352, 389, 401, 259
See application file for complete search history.

(56) References Cited

U.S. PATENT DOCUMENTS

| | | | |
|---|---|---|---|
| 7,328,280 B2 | 2/2008 | Takeda et al. | |
| 7,454,510 B2 | 11/2008 | Kleyman et al. | |
| 7,620,033 B2 * | 11/2009 | Chu et al. | 370/352 |
| 2005/0259637 A1 * | 11/2005 | Chu et al. | 370/352 |
| 2006/0182100 A1 * | 8/2006 | Li et al. | 370/389 |
| 2007/0076729 A1 * | 4/2007 | Takeda | 370/401 |
| 2008/0298395 A1 * | 12/2008 | Ban | 370/474 |
| 2009/0097477 A1 * | 4/2009 | Zhu | 370/352 |
| 2009/0228593 A1 * | 9/2009 | Takeda | 709/227 |
| 2009/0323559 A1 * | 12/2009 | Chen et al. | 370/259 |
| 2010/0146126 A1 * | 6/2010 | Lin et al. | 709/228 |

FOREIGN PATENT DOCUMENTS
TW     I260880     8/2006

* cited by examiner

*Primary Examiner* — Haresh N Patel
(74) *Attorney, Agent, or Firm* — Jianq Chyun IP Office

(57) ABSTRACT

A network traversal method is provided. A plurality of endpoints in a plurality of network address translators (NATs) is grouped into a plurality of groups, and an on-line server is deployed for managing information related to the groups and information related to connections that have traversed the NATs, wherein the endpoints in the same NAT are grouped into the same group. In addition, when one of the endpoints is about to establish a connection with another one of the endpoints, whether there is a peer-to-peer direct connection between the groups corresponding to the two endpoints is determined. If there is the peer-to-peer direct connection between the groups corresponding to the two endpoints, the connection between the two endpoints is established by using the peer-to-peer direct connection. Thereby, the network traversal method can effectively reduce the time, cost, and complexity for traversing the NATs.

16 Claims, 6 Drawing Sheets

| Group name 202 | Group type 204 | User name 206 | User contact 208 | Connection group name 210 | Connection user name 212 |
|---|---|---|---|---|---|
| 140.96.178.1 | Symmetric | 102 | 10.0.0.1:8000 | – | – |
| 140.96.178.1 | Symmetric | 104 | 10.0.0.2:8000 | – | – |
| 140.96.178.1 | Symmetric | 106 | 10.0.0.3:8000 | 140.96.178.5 | 108 |
| 140.96.178.5 | Symmetric | 108 | 10.0.0.1:8000 | 140.96.178.1 | 106 |
| 140.96.178.5 | Symmetric | 110 | 10.0.0.2:8000 | – | – |

NETWORK TRAVERSAL METHOD FOR ESTABLISHING CONNECTION BETWEEN TWO ENDPOINTS AND NETWORK COMMUNICATION SYSTEM

CROSS-REFERENCE TO RELATED APPLICATION

This application claims the priority benefit of Taiwan application serial no. 98129547, filed on Sep. 2, 2009. The entirety of the above-mentioned patent application is hereby incorporated by reference herein and made a part of this specification.

BACKGROUND OF THE INVENTION

1. Field of the Invention

The disclosure relates to a network traversal method and a network communication system using the network traversal method.

2. Description of Related Art

Along with the development of network technologies and infrastructures and the increase of network users, many network address translators (NATs) are adopted to resolve the problem of insufficient network addresses in the Internet Protocol (IP). However, the adoption of NATs brings a great operation obstacle to applications using peer-to-peer transmission, such as P2P file transmission applications and IP phone applications.

To be specific, NATs can be categorized into full cone NATs, restricted cone NATs, port restricted cone NATs, and symmetric NATs. A characteristic of the full cone NATs is that after a connection is established between an internal user and an external user, any external user can communicate with the internal user according to a NAT assigned address/port of the internal user. A characteristic of the restricted cone NATs is that after a connection is established between an internal user and an external user, only the external address connected with the internal user can communicate with the internal user according to a NAT assigned address/port of the internal user. A characteristic of the port restricted cone NATs is that after a connection is established between an internal user and an external user, only the external addresses/ports connected to the internal user can communicate with the internal user according to a NAT assigned address/port of the internal user. A characteristic of the symmetric NATs is that a NAT assigned address/port is assigned to each application sent by an internal user to different destination, and only the address/port of the corresponding destination can communicate with the NAT assigned address/port.

As described above, in an environment in which many users use private IP addresses (or virtual IP addresses), when an external user outside a NAT is about to establish a data transmission connection with an internal user inside the NAT, the request message issued by the external user is blocked by the NAT and accordingly the internal user cannot receive this request message. As a result, the connection cannot be established.

In order to resolve foregoing problem, network protocols such as the simple traversal of user datagram protocol through NAT (STUN), the traversal using relay NAT (TURN), and the interactive connectivity establishment (ICE) are provided. The STUN network protocol specified by Request for Comments (RFC) 3489 provides a technique, wherein an internal user inside a NAT can obtain the addresses/ports assigned by the NAT and the type of the NAT, and can establish a connection with an external user outside the NAT by providing aforementioned information to the external user. However, the STUN network protocol cannot work on a symmetric NAT. According to the TURN network protocol, a TURN server is deployed in a public domain, and the TURN server assigns an address/port to an internal user inside a NAT and records the mapping relationship between an address/port used by the internal user for communicating with external users and the assigned address/port in a mapping table. After that, data entering and leaving the NAT is always relayed by the TURN server so as to traverse the NAT. Even though the TURN network protocol can be applied to traversal of a symmetric NAT, the TURN server may become a bottleneck in the performance of the entire system since the data streams of all internal users of the NAT have to pass through the TURN server. The ICE network protocol provides a NAT traversal method making use of the STUN network protocol and the TURN network protocol. In this NAT traversal method, when a connection is to be established between users by traversing a NAT, the users first collect their own candidate address information and then exchange the candidate address information with each other. After that, each user performs a connection testing by using the other party's candidate address. Finally, the users determine an optimal connection for transmitting data.

Some NAT traversal methods are provided based on the network protocols described above to allow an external user outside a NAT to traverse the NAT and establish a connection with an internal user inside the NAT. For example, in a hole punching method provided by the RFC 5128, a rendezvous server is deployed in a public domain, and every NAT user establishes a control message connection with the rendezvous server. When a user A is about to establish a direct NAT traversal connection with a user B, the user A first sends a connection establishment request message to the rendezvous server. After receiving the connection establishment request message, the rendezvous server sends the NAT assigned address/port of the user B to the user A and the NAT assigned address/port of the user A to the user B. Once the user A receives the address information of the user B, the user A sends a testing packet to the NAT assigned address/port of the user B. Herein the testing packet is blocked by the NAT of the user B, but meanwhile, a NAT mapping table of the user A is updated to allow the NAT assigned address/port of the user B to transfer data to the user A. After that, the user B also sends a testing packet to the NAT assigned address/port of the user A. Herein the NAT mapping table of the user B is updated to allow the NAT assigned address/port of the user A to transmit data to the user B. Accordingly, a bidirectional NAT traversal connection is successfully established. Even though the hole punching method can resolve some problems in NAT traversal, it cannot be applied if both NATs are symmetric NATs or one of them is a port restricted cone NAT and the other one is a symmetric NAT because, as described above, a symmetric NAT assigns different NAT assigned addresses/ports according to different destinations.

A port prediction technique is disclosed in U.S. Pat. No. 7,328,280 in order to achieve NAT traversal when both NATs are symmetric NATs or one of them is a port restricted cone NAT and the other one is a symmetric NAT. Because a symmetric NAT assigns ports to its internal users at certain intervals, in the port prediction method, the user that is about to establish a connection first tests the port assignation rule of the corresponding NAT and obtain the port assignation rule of the other party through information exchange. After that, the users respectively send a plurality of testing packets to the port predicted according to the other party's port assignation rule. Theoretically, a NAT traversal connection is established through the procedure described above. However, in the present technique, a lot of prediction messages and communication time are spent for predicting the ports assigned by the NATs, and the prediction success rate cannot be ensured.

SUMMARY OF THE INVENTION

According to an exemplary embodiment of the disclosure, a network traversal method for establishing a connection between a first endpoint and a second endpoint among a plurality of endpoints is provided. The network traversal method includes deploying an on-line server, wherein the endpoints respectively register registration information in the on-line server and keep an on-line state with the on-line server. The network traversal method also includes grouping the endpoints according to the registration information of the endpoints, wherein the first endpoint is inside a first network address translator (NAT), the second endpoint is inside a second NAT, the endpoints in the first NAT are grouped into a first group, and the endpoints in the second NAT are grouped into a second group. The network traversal method further includes determining whether there is an available connection between the endpoints grouped into the first group and the endpoints grouped into the second group, wherein if there is the available connection, the connection between the first endpoint and the second endpoint is established by using the available connection.

According to an exemplary embodiment of the disclosure, a network communication system including a plurality of NATs, a plurality of endpoints, and an on-line server is provided. A first endpoint among the endpoints is inside a first NAT among the NATs, and a second endpoint among the endpoints is inside a second NAT among the NATs. The on-line server groups the endpoints, wherein the endpoints inside the first NAT are grouped into a first group, and the endpoints inside the second NAT are grouped into a second group. In the network communication system, the first endpoint determines whether there is an available connection between the endpoints grouped into the first group and the endpoints grouped into the second group, wherein if there is the available connection, the first endpoint establishes a connection between the first endpoint and the second endpoint by using the available connection.

As described above, in exemplary embodiments of the disclosure, the first endpoint establishes a connection between the first endpoint and the second endpoint by using an existing connection between the two groups, so that the time, cost, and complexity of NAT traversal are all reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 illustrates an example of a group and connection list according to an exemplary embodiment of the disclosure.

DESCRIPTION OF THE EMBODIMENTS

Figure 1:
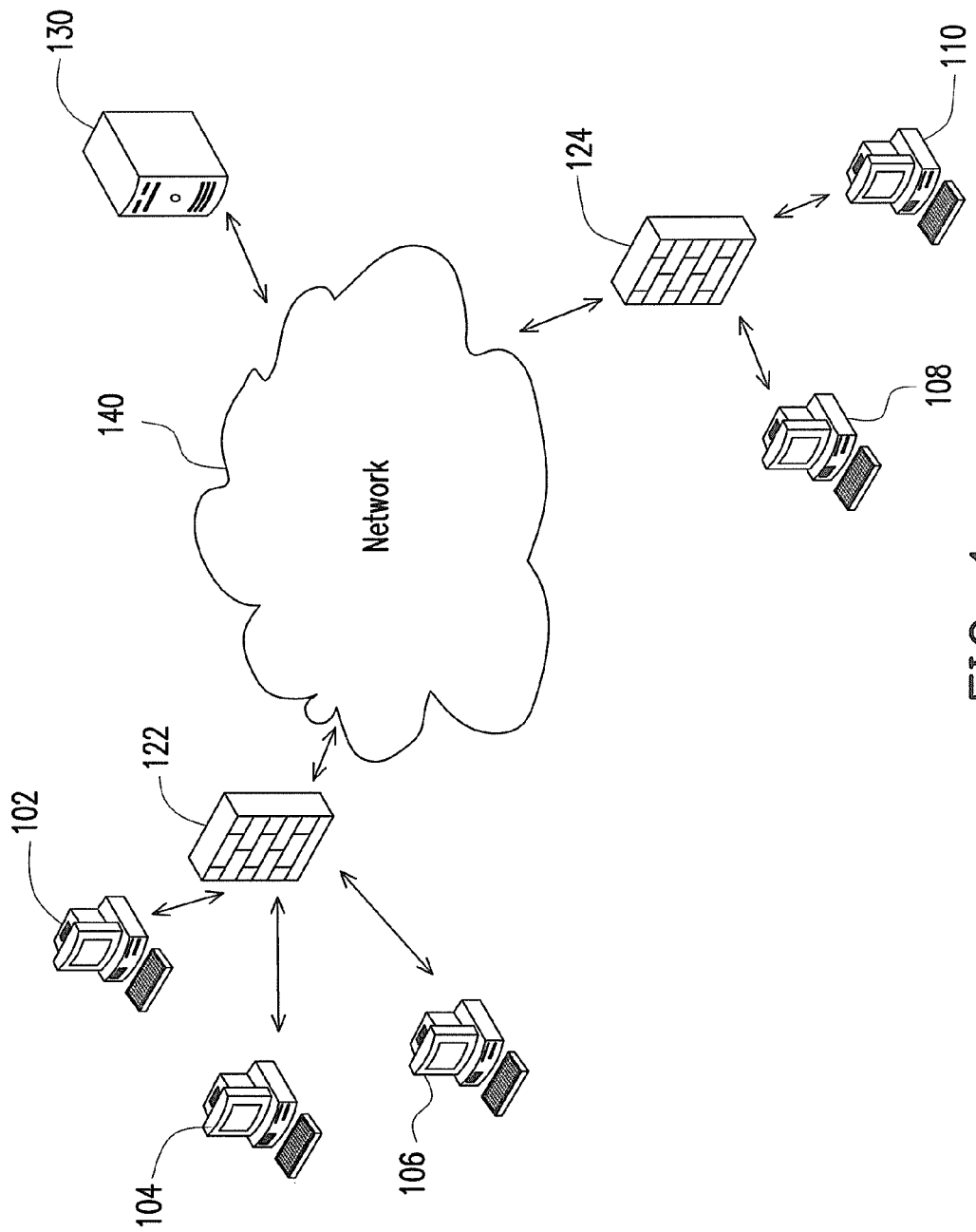
FIG. 1 is a diagram of a network communication system according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a network communication system according to an exemplary embodiment of the disclosure.

Referring to FIG. 1, the network communication system includes a first endpoint 102, a second endpoint 104, a third endpoint 106, a fourth endpoint 108, a fifth endpoint 110, a first network address translator (NAT) 122, a second NAT 124, and an on-line server 130.

The first endpoint 102, the second endpoint 104, the third endpoint 106, the fourth endpoint 108, and the fifth endpoint 110 have a network connection function supporting the Transmission Control Protocol/Internet Protocol (TCP/IP) and can transmit and receive digital contents (for example, IP phone calls, music files, video/audio files, and instant messages) through a network 140, wherein the network 140 is the Internet constructed by using TCP/IP.

In the present exemplary embodiment, the first endpoint 102, the second endpoint 104, the third endpoint 106, the fourth endpoint 108, and the fifth endpoint 110 are all connected to the network 140 in a wired mode. However, the disclosure is not limited thereto, and the first endpoint 102, the second endpoint 104, the third endpoint 106, the fourth endpoint 108, and the fifth endpoint 110 may also be connected to the network 140 respectively in a wired or wireless mode. In addition, in the present exemplary embodiment, the first endpoint 102, the second endpoint 104, the third endpoint 106, the fourth endpoint 108, and the fifth endpoint 110 are personal computers (PCs). However, the disclosure is not limited thereto, and the first endpoint 102, the second endpoint 104, the third endpoint 106, the fourth endpoint 108, and the fifth endpoint 110 may also be servers, personal digital assistants (PDAs), or other electronic devices that can be connected to the network 140.

The first NAT 122 and the second NAT 124 are used for translating private IP addresses and public IP addresses. Namely, the first NAT 122 and the second NAT 124 translate the address/port in the header of a passing IP packet into another address/port so that the first endpoint 102, the second endpoint 104, the third endpoint 106, the fourth endpoint 108, and the fifth endpoint 110 using private IP addresses can be connected to the network 140. The technique of NATs is well known to those skilled in the art therefore will not be described herein. In the present exemplary embodiment, the first NAT 122 and the second NAT 124 are both symmetric NATs. However, the disclosure is not limited thereto, and the first NAT 122 and the second NAT 124 may also be other types of NATs.

As shown in FIG. 1, the first endpoint 102, the second endpoint 104, and the third endpoint 106 are in the first NAT 122, and the fourth endpoint 108 and the fifth endpoint 110 are inside the second NAT 124. Namely, the first endpoint 102, the second endpoint 104, and the third endpoint 106 are in the domain of the first NAT122 and are connected to the network 140 through the address translation of the first NAT 122. Meanwhile, the fourth endpoint 108 and the fifth endpoint 110 are in the domain of the second NAT 124 and are connected to the network 140 through the address translation of the second NAT 124. Herein the private IP address/port used by the first endpoint 102 is 10.0.0.1:8000, the private IP address/port used by the second endpoint 104 is 10.0.0.2:8000, the private IP address/port used by the third endpoint 106 is 10.0.0.3:8000, the private IP address/port used by the fourth endpoint 108 is 10.0.0.1:8000, the private IP address/port used by the fifth endpoint 110 is 10.0.0.2:8000, the public IP address used by the first NAT 122 is 140.96.178.1, and the public IP address used by the second NAT 124 is 140.96.178.5.

It has to be understood that even though the present exemplary embodiment is described with only two NATs and five endpoints, the disclosure is not limited thereto, and the network communication system may include any number of NATs and any number of endpoints.

The on-line server 130 has a network connection function supporting TCP/IP and is coupled to the network 140. In the present exemplary embodiment, the on-line server 130 is a single server in a public domain. However, the disclosure is not limited thereto, and in another exemplary embodiment of the disclosure, the on-line server 130 may also be composed of multiple servers in a peer-to-peer overlay network.

In the present exemplary embodiment, the on-line server 130 provides a registration interface such that the first endpoint 102, the second endpoint 104, the third endpoint 106, the fourth endpoint 108, and the fifth endpoint 110 can respectively establish a control channel with the on-line server 130, so as to keep an on-line state.

For example, when the first endpoint 102 establishes a connection with the on-line server 130 by using the transmission control protocol (TCP) and registers in the registration interface, the on-line server 130 records the registration information of the first endpoint 102, wherein the registration information includes a user account field, a user internal address/port field, a NAT type field, and a user external network address/port field. The user account field records the account of an endpoint (for example, the account of the first endpoint 102 is "102"), the user internal network address field records the private IP address/port of the endpoint (for example, the private IP address/port of the first endpoint 102 is "10.0.0.1:8000"), the NAT type field records the type of the NAT corresponding to the endpoint (for example, the type of the first NAT 122 corresponding to the first endpoint 102 is "symmetric NAT"), and the user external network address field records the public IP address/port assigned to the endpoint by the corresponding NAT (for example, the public IP address/port assigned by the first NAT 122 to the first endpoint 102 is "140.96.178.1:1111"). After the first endpoint 102 registers, the first endpoint 102 keep the connection with the on-line server 130 until the first endpoint 102 terminates the connection with the on-line server 130. Similarly, in the present example, the second endpoint 104, the third endpoint 106, the fourth endpoint 108, and the fifth endpoint 110 also register and keep the connection with the on-line server 130 through the method described above.

In the present exemplary embodiment, the on-line server 130 groups the registered endpoints and stores a group and connection list for recording the information of the endpoints registered to the on-line server 130. For example, the on-line server 130 groups the endpoints according to the corresponding NATs thereof and records any peer-to-peer direct connection between the registered endpoints.

FIG. 2 illustrates an example of a group and connection list according to an exemplary embodiment of the disclosure.

Referring to FIG. 2, the group and connection list 200 includes a group name field 202, a group type field 204, a user name field 206, a user contact field 208, a connection group name field 210, and a connection user name field 212.

The group name field 202 records the names of the groups corresponding to the registered endpoints, wherein the on-line server 130 uses the public IP addresses of the NATs as the names of the groups.

The group type field 204 records the types of the NATs corresponding to the registered endpoints.

The user name field 206 records the accounts of the registered endpoints.

The user contact field 208 records the private IP addresses/ports of the registered endpoints.

The connection group name field 210 records the names of the connected groups if the registered endpoints have established peer-to-peer direct connections.

The connection user name field 212 records the accounts of the connected endpoints when the registered endpoints have established peer-to-peer direct connections.

For example, the on-line server 130 groups the first endpoint 102, the second endpoint 104, and the third endpoint 106 into a first group and the fourth endpoint 108 and the fifth endpoint 110 into a second group according to the NAT corresponding to each endpoint, wherein the name of the first group is "140.96.178.1", and the name of the second group is "140.96.178.5". Accordingly, the information of each endpoint is recorded in the group and connection list 200. In particular, assuming that a peer-to-peer direct connection has been established between the third endpoint 106 in the first group and the fourth endpoint 108 in the second group through the port prediction method described above, the information of the third endpoint 106 in the group and connection list 200 contains the information of the peer-to-peer direct connection between the third endpoint 106 and the fourth endpoint 108 in the second group, and the information of the fourth endpoint 108 in the group and connection list 200 contains the information of the peer-to-peer direct connection between the fourth endpoint 108 and the third endpoint 106 in the first group.

Particularly, in the present exemplary embodiment, when an endpoint (i.e., a initiating endpoint) in the network communication system is about to traverse NATs to connect with another endpoint (i.e., an invited endpoint), the initiating endpoint and the invited endpoint exchange their candidate address information and the corresponding NAT type information with each other through the on-line server 130. If both NATs are symmetric NATs or one of them is a port restricted cone NAT and the other one is a symmetric NAT, the initiating endpoint sends an inquiry message to the on-line server 130 to inquiry whether there is a peer-to-peer direct connection between the group that the initiating endpoint belongs to and the group that the invited endpoint belongs to, and if there is such a peer-to-peer direct connection, the initiating endpoint tries to establish a connection with the invited endpoint by using the existing peer-to-peer direct connection.

Figure 3:
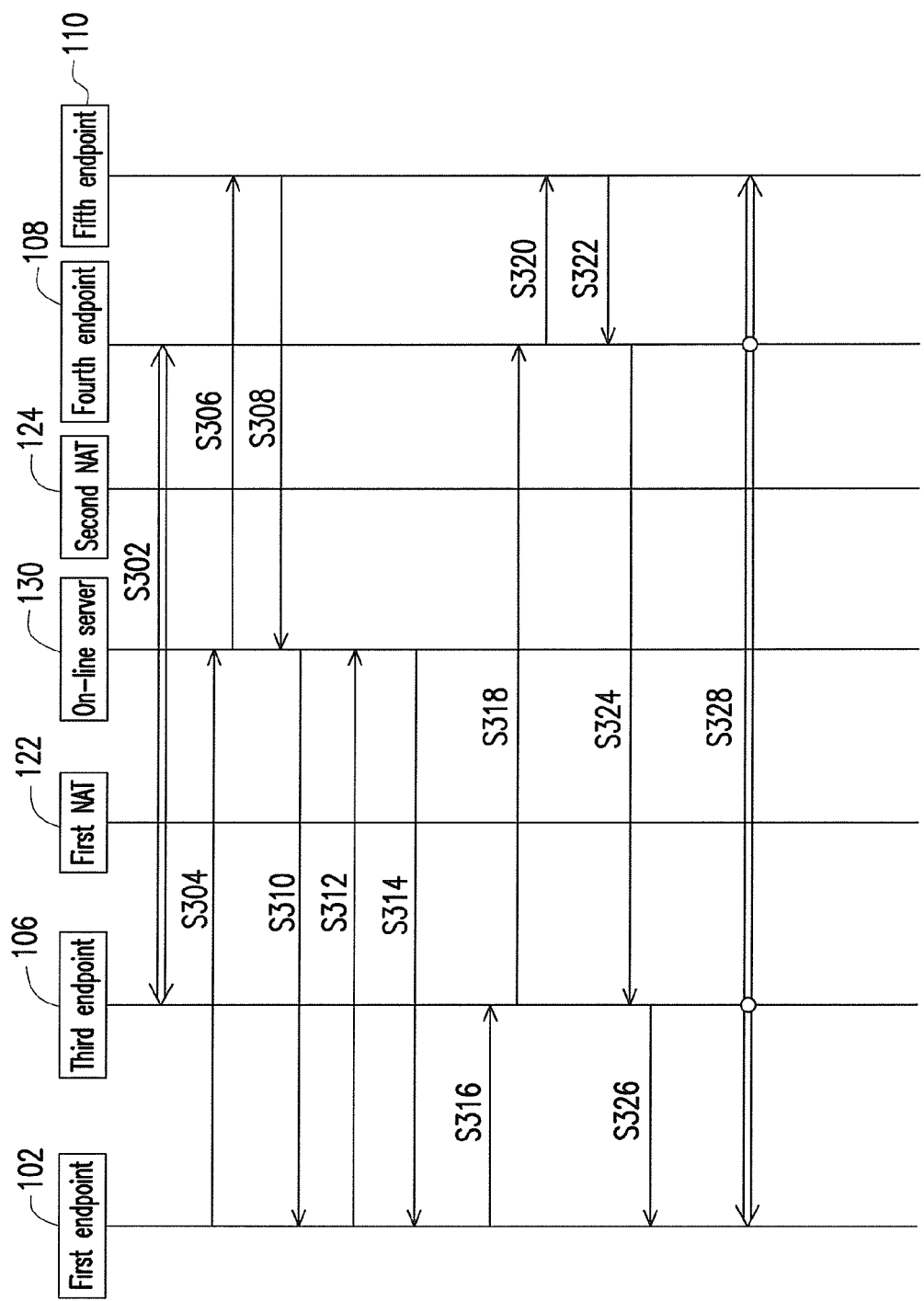
FIG. 3 illustrates an example of how a connection is established according to an exemplary embodiment of the disclosure.

FIG. 3 illustrates an example of how a connection is established according to an exemplary embodiment of the disclosure.

Referring to FIG. 3, it is assumed that a peer-to-peer direct connection has been established between the third endpoint 106 in the first group and the fourth endpoint 108 in the second group (S302). When the first endpoint 102 is about to establish a connection with the fifth endpoint 110, the first endpoint 102 sends a connection request and a candidate address information to the on-line server 130 (S304). The on-line server 130 sends the connection request and the candidate address information of the first endpoint 102 and the corresponding NAT type information to the fifth endpoint 110 (S306). Similarly, after the fifth endpoint 110 receives the connection request and the candidate address information of the first endpoint 102 from the on-line server 130, the fifth endpoint 110 sends its own candidate address information to the on-line server 130 (S308). The on-line server 130 sends the candidate address information of the fifth endpoint 110 and the corresponding NAT type information to the first endpoint 102 (S310). Accordingly, the first endpoint 102 and the fifth endpoint 110 get to know that the other party is inside a symmetric NAT.

After that, the first endpoint 102 sends an inquiry message to the on-line server 130 to inquiry the connection list of the same groups in the group and connection list 200 (S312) and receives a response message from the on-line server 130 (S314) to determine whether there is already a peer-to-peer direct connection between an endpoint in the group (i.e., the first group) of the first endpoint 102 and an endpoint in the group (i.e., the second group) of the fifth endpoint.

As described above, since there is already a peer-to-peer direct connection between the third endpoint 106 in the first group and the fourth endpoint 108 in the second group, the first endpoint 102 sends a connection authorization request to the third endpoint 106 (S316). If the third endpoint 106 approves the connection authorization request, the third endpoint 106 passes the connection authorization request to the fourth endpoint 108 (S318). If the fourth endpoint 108 approves the connection authorization request, the fourth endpoint 108 notifies the fifth endpoint 110 (S320). After that, if the fifth endpoint 110 approves the connection authorization request, the fifth endpoint 110 sends an approved acknowledgement response to the fourth endpoint 108 (S322). The fourth endpoint 108 passes the approved acknowledgement response to the third endpoint 106 (S324), and the third endpoint 106 passes the approved acknowledgement response to the first endpoint 102 (S326). Finally, the connection between the first endpoint 102 and the fifth endpoint 110 is established by using the peer-to-peer direct connection between the third endpoint 106 and the fourth endpoint 108 (S328).

As described above, because there is already a peer-to-peer direct connection between the endpoints in the first NAT 122 and the endpoints in the second NAT 124, the connection between the first endpoint 102 and the fifth endpoint 110 can be established through the connection reusing mechanism illustrated in FIG. 3, so that it is not needed to execute other NAT traversal techniques and the cost can be reduced.

It should be mentioned that in the example illustrated in FIG. 3, the third endpoint 106 and the fourth endpoint 108 send the approved acknowledgement response to the first endpoint 102 to allow the first endpoint 102 to use the peer-to-peer direct connection between the third endpoint 106 and the fourth endpoint 108. However, in another example, a requested endpoint may reject the connection authorization request from another endpoint according to the bandwidth usage status thereof. For example, when the first endpoint 102 sends a connection authorization request to the third endpoint 106, the third endpoint 106 rejects the connection authorization request of the first endpoint 102 if the number of endpoints connected through the third endpoint 106 has exceeded a connection threshold. For example, in the present exemplary embodiment, the connection threshold is set to 5, however, the disclosure is not limited thereto, any suitable value can be as the connection threshold. Accordingly, certain connection quality of the requested endpoint can be assured when the requested endpoint shares its established peer-to-peer direct connection with other endpoints.

In addition, in the present exemplary embodiment, the requested endpoint has to be able to identify the destination of a received packet when the requested endpoint allows other endpoints to use the established peer-to-peer direct connection thereof. Thus, in the present exemplary embodiment, the actual origin address and the actual destination address are included in an IP packet so that the packet can be successfully transmitted.

Figure 4:
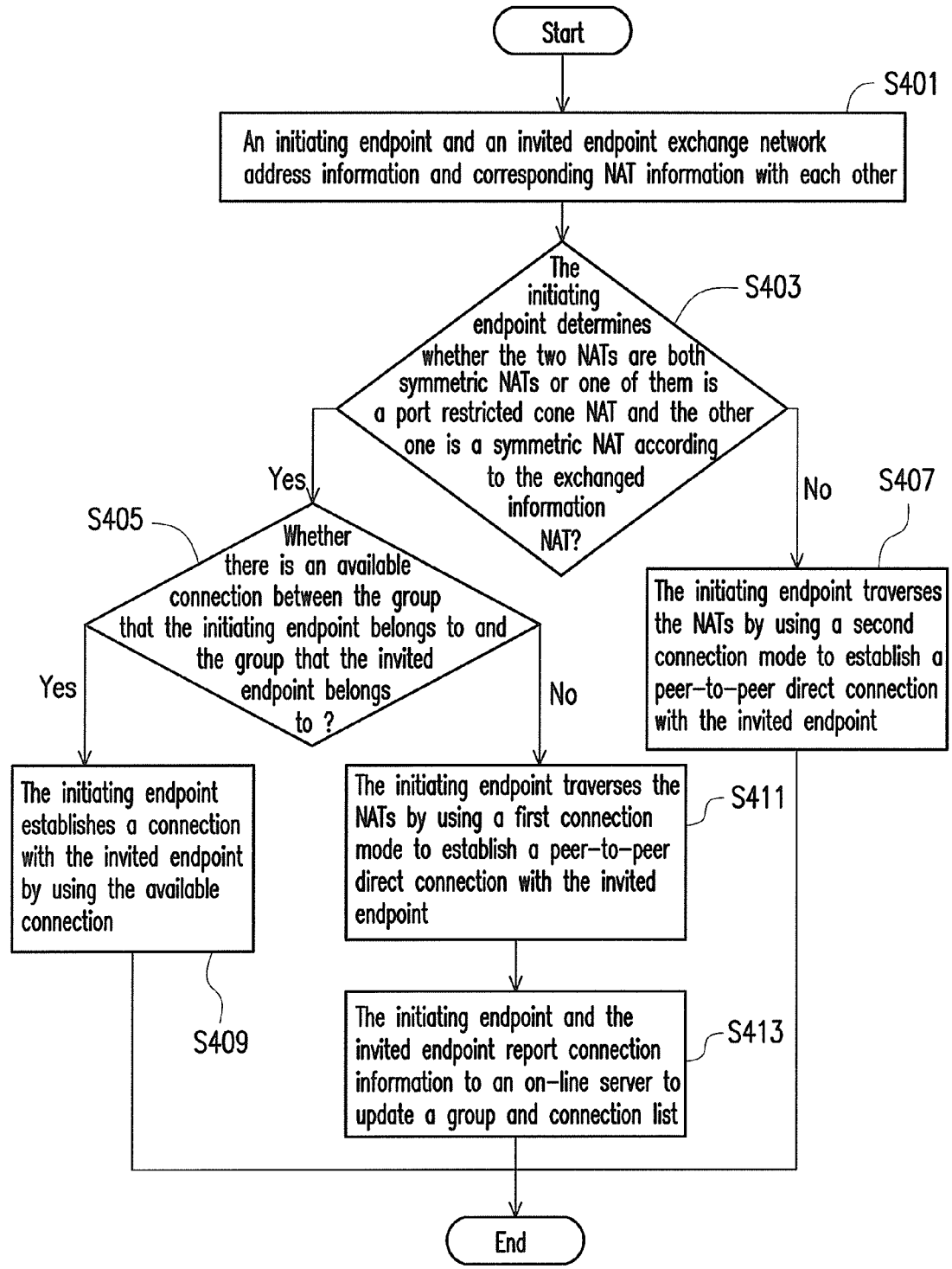
FIG. 4 is a flowchart of a network traversal method according to an exemplary embodiment of the disclosure.

FIG. 4 is a flowchart of a network traversal method according to an exemplary embodiment of the disclosure.

Referring to FIG. 4, first, in step S401, an initiating endpoint (for example, the first endpoint 102 in FIG. 3) and an invited endpoint (for example, the fifth endpoint 110 in FIG. 3) exchange the candidate address information and corresponding NAT information with each other.

In step S403, the initiating endpoint determines whether both NATs are symmetric NATs or one of them is a port restricted cone NAT and the other one is a symmetric NAT according to the exchanged information.

If it is determined in step S403 that both NATs are symmetric NATs or one of them is a port restricted cone NAT and the other one is a symmetric NAT, in step S405, whether there is an available connection between the group that the initiating endpoint belongs to and the group that the invited endpoint belongs to. Otherwise, in step S407, the initiating endpoint traverses the NATs by using a second connection mode to establish a peer-to-peer direct connection with the invited endpoint. Herein the second connection mode may be a hole punching method (mode) or other suitable connection methods.

Figure 5:
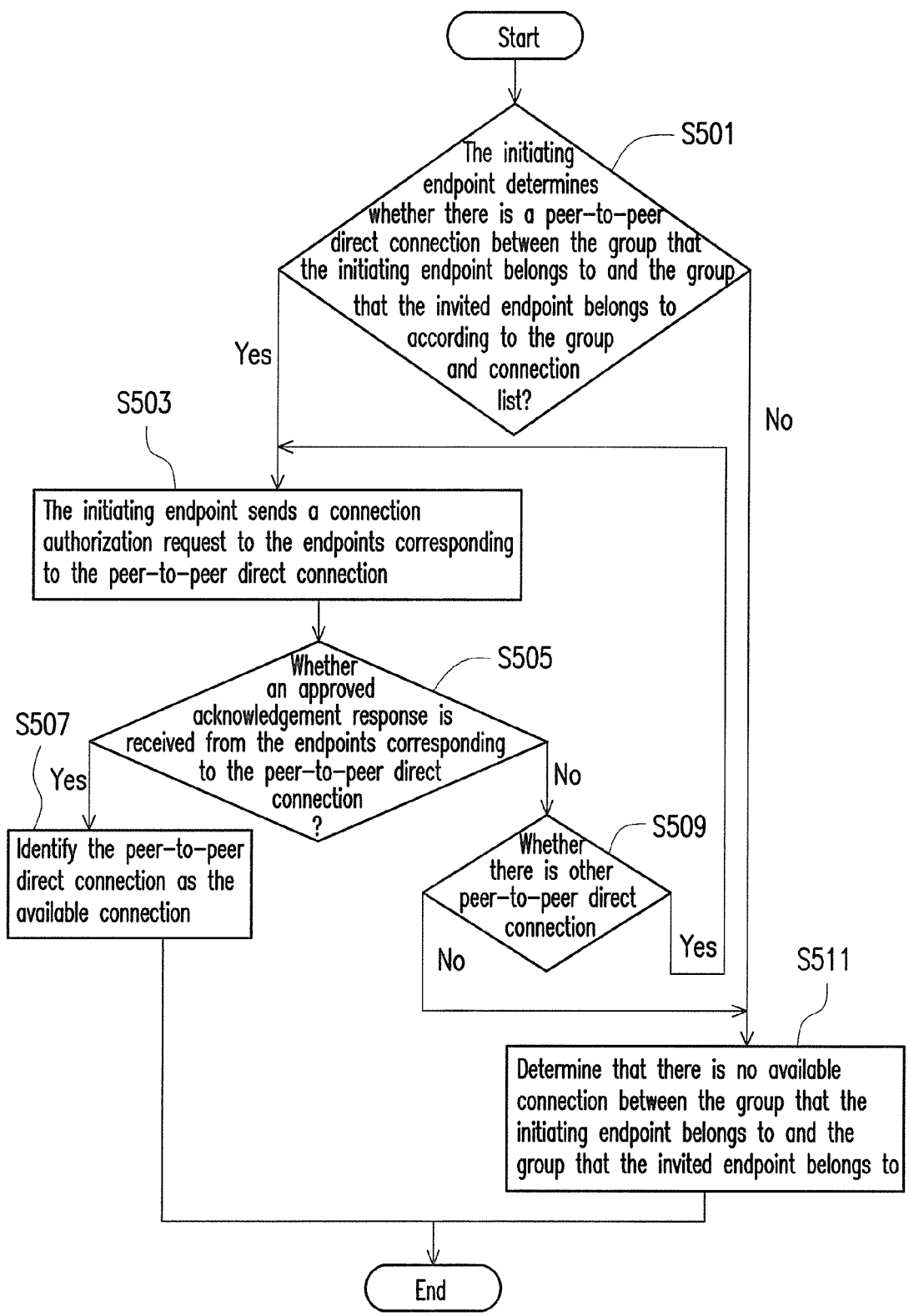
FIG. 5 is a detailed flowchart of step S405 in FIG. 4 according to an exemplary embodiment of the disclosure.

FIG. 5 is a detailed flowchart of step S405 in FIG. 4 according to an exemplary embodiment of the disclosure.

Referring to FIG. 5, in step S501, the initiating endpoint determines whether there is a peer-to-peer direct connection between the group that the initiating endpoint belongs to and the group that the invited endpoint belongs to according to the group and connection list 200 in the on-line server 130.

If the initiating endpoint determines in step S501 that there is no peer-to-peer direct connection between the group that the initiating endpoint belongs to and the group that the invited endpoint belongs to, in step S511, it is determined that there is no available connection between the group of the initiating endpoint and the group of the invited endpoint.

If the initiating endpoint determines in step S501 that there is a peer-to-peer direct connection between the group that the initiating endpoint belongs to and the group that the invited endpoint belongs to, in step S503, the initiating endpoint sends a connection authorization request to the endpoints corresponding to the peer-to-peer direct connection (i.e., the endpoint having the peer-to-peer direct connection), and in step S505, the initiating endpoint determines whether an approved acknowledgement response is received from the endpoints corresponding to the peer-to-peer direct connection.

If the approved acknowledgement response is received, in step S507, the peer-to-peer direct connection is identified as an available connection. Otherwise, in step S509, whether there is other peer-to-peer direct connection between the group that the initiating endpoint belongs to and the group that the invited endpoint belongs to is determined. If there is still other peer-to-peer direct connection between the group that the initiating endpoint belongs to and the group that the invited endpoint belongs to, step S503 is executed. Otherwise, step S511 is executed.

Referring to FIG. 4 again, if it is determined in step S405 that there is the available connection between the group that the initiating endpoint belongs to and the group that the invited endpoint belongs to, in step S409, the initiating endpoint establishes the connection between the initiating endpoint and the invited endpoint by using the available connection.

If it is determined in step S405 that there is no available connection between the group that the initiating endpoint belongs to and the group that the invited endpoint belongs to, in step S411, the initiating endpoint uses a first connection mode to traverse the NATs so as to establish a peer-to-peer direct connection with the invited endpoint, and in step S413, the initiating endpoint and the invited endpoint report the peer-to-peer direct connection information to the on-line server 130 to update the group and connection list 200. Namely, if there is no peer-to-peer direct connection between the third endpoint 106 and the fourth endpoint 108 in the example illustrated in FIG. 3, the first endpoint 102 and the fifth endpoint 110 traverse the NATs by using the first connection mode to establish the peer-to-peer direct connection between the first endpoint 102 and the fifth endpoint 110 and update the peer-to-peer direct connection information in the group and connection list 200 so that subsequently the peer-to-peer direct connection can be used by other endpoints. Similarly, the first connection mode herein may be the port prediction method (mode) or other suitable connection methods.

Figure 6:
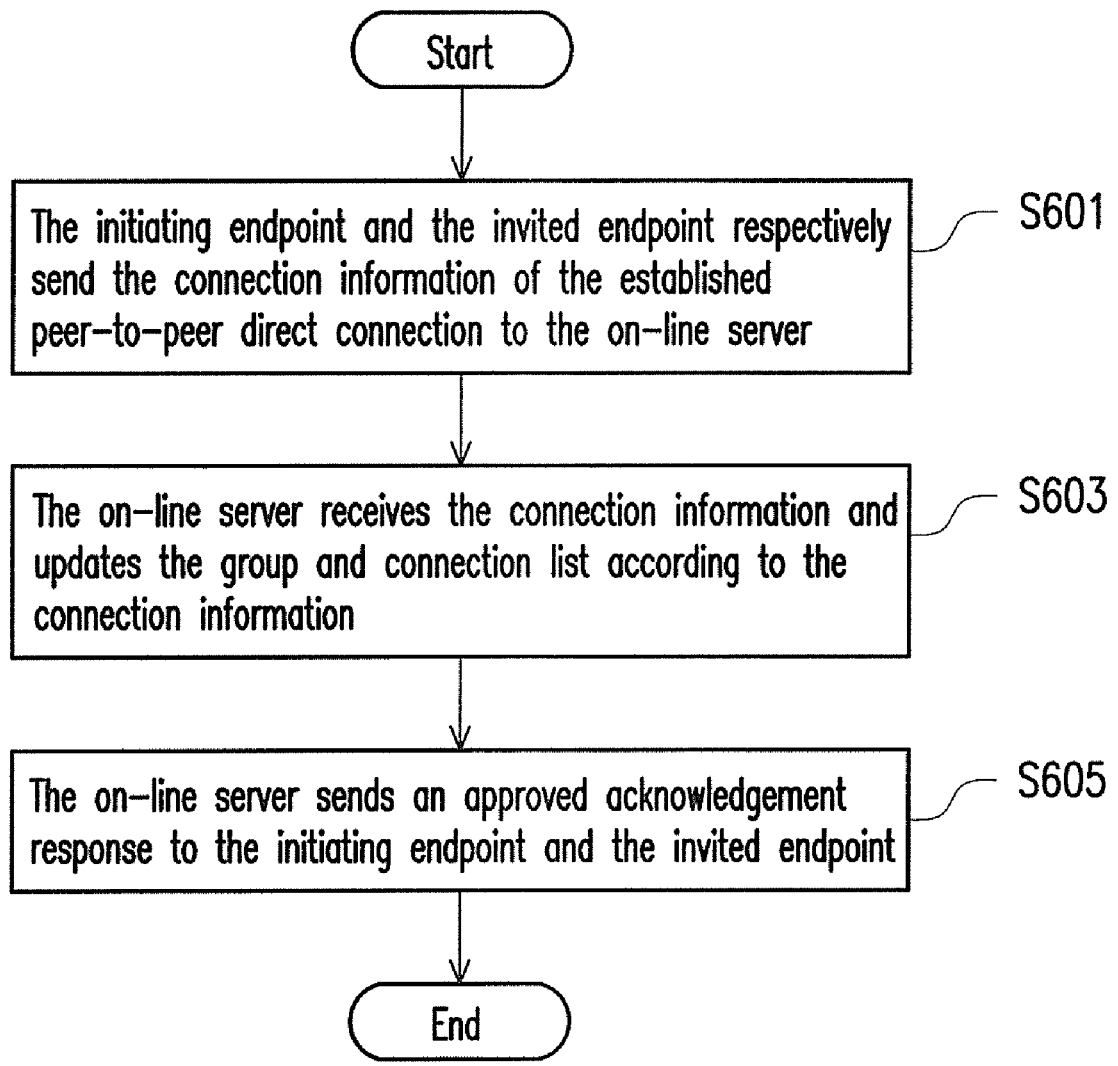
FIG. 6 is a detailed flowchart of step S413 in FIG. 4 according to an exemplary embodiment of the disclosure.

FIG. 6 is a detailed flowchart of step S413 in FIG. 4 according to an exemplary embodiment of the disclosure.

Referring to FIG. 6, in step S601, the initiating endpoint and the invited endpoint respectively send the connection information of the established peer-to-peer direct connection to the on-line server 130. In the present exemplary embodiment, the connection information contains a group name, a user name, a connection group name, and a connection user name in sequence. For example, in the example illustrated in FIG. 3, if the third endpoint 106 does not allow the first endpoint 102 to reuse the peer-to-peer direct connection between the third endpoint 106 and the fourth endpoint 108, and after the first endpoint 102 and the fifth endpoint 110 establish the peer-to-peer direct connection by using the first mode through foregoing step S411, the first endpoint 102 sends the connection information containing {140.96.178.1, 102, 140.96.178.5, 110} to the on-line server 130, and the fifth endpoint 110 transfers the connection information containing {140.96.178.5, 110, 140.96.178.1, 102} to the on-line server 130.

Next, in step S603, the on-line server 130 receives the connection information and updates the group and connection list 200 according to the connection information. Finally, in step S605, the on-line server 130 sends an approved acknowledgement response to the initiating endpoint and the invited endpoint.

It should be mentioned that in the step of determining whether there is an available connection illustrated in FIG. 5, whether the connection reusing mechanism illustrated in FIG. 3 is executed is only determined (i.e., step S409) when the corresponding NATs of the initiating endpoint and the invited endpoint are both symmetric NATs or one of them is a port restricted cone NAT and the other one is a symmetric NAT. However, the disclosure is not limited thereto, and in another exemplary embodiment of the disclosure, the step of determining the types of the NATs is omitted, and whether the connection reusing mechanism can be executed is directly determined. In other words, the application of the disclosure is not limited to such situations that the NATs corresponding to the initiating endpoint and the invited endpoint are both symmetric NATs or one of them is a port restricted cone NAT and the other one is a symmetric NAT. Instead, the connection reusing mechanism described above can be applied to the traversal of any other types of NATs.

As described above, in exemplary embodiments of the disclosure, NAT traversal is accomplished by using an established peer-to-peer direct connection, so that the time, cost, and complexity for traversing NATs are greatly reduced. In addition, because the transmitted packets belong to the same domain, both the transmission time and the packet cost are greatly reduced. Moreover, in the disclosure, the endpoint having an established peer-to-peer direct connection can control the number of endpoints sharing the peer-to-peer direct connection according to the bandwidth quality thereof, so that data flow can be distributed and performance bottleneck is avoided.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A network traversal method, for establishing a connection between a first endpoint and a second endpoint among a plurality of endpoints, the network traversal method comprising:

deploying an on-line server, wherein each of the endpoints respectively registers a registration information in the on-line server and keeps an on-line state with the on-line server;

grouping the endpoints according to the registration information of the endpoints, wherein the first endpoint is inside a first network address translator (NAT), the second endpoint is inside a second NAT, the endpoints inside the first NAT are grouped into a first group, and the endpoints inside the second NAT are grouped into a second group;

determining whether there is an available connection between the endpoints grouped into the first group and the endpoints grouped into the second group;

when there is the available connection, establishing the connection between the first endpoint and the second endpoint by using the available connection;

determining whether the first NAT and the second NAT are respectively a full cone NAT, a restricted cone NAT, a port restricted cone NAT, or a symmetric NAT;

establishing a peer-to-peer direct connection between the first endpoint and the second endpoint by using a second connection mode when the first NAT and the second NAT are respectively the full cone NAT, the restricted cone NAT, or the port restricted cone NAT; and establishing the peer-to-peer direct connection between the first endpoint and the second endpoint by using the second connection mode when one of the first NAT and the second NAT is the symmetric NAT and another one of the first NAT and the second NAT is the full cone NAT or the restricted cone NAT, wherein the second connection mode includes a port prediction mode or a hole punching mode.

2. The network traversal method according to claim 1, wherein the step of determining whether there is the available connection between the endpoints grouped into the first group and the endpoints grouped into the second group comprises:

determining whether there is a peer-to-peer direct connection between the endpoints grouped into the first group and the endpoints grouped into the second group;

when there is the peer-to-peer direct connection, sending a connection authorization request to the endpoints corresponding to the peer-to-peer direct connection; and identifying the peer-to-peer direct connection as the available connection when an approved acknowledgement response is received from the endpoints corresponding to the peer-to-peer direct connection, and not identifying the peer-to-peer direct connection as the available connection when the approved acknowledgement response is not received from or the connection authorization request is rejected by the endpoints corresponding to the peer-to-peer direct connection.

3. The network traversal method according to claim 2 further comprising configuring a group and connection list in the on-line server to record the grouped endpoints and the peer-to-peer direct connection between the grouped endpoints, and wherein the step of determining whether there is the peer-to-peer direct connection between the endpoints grouped into the first group and the endpoints grouped into the second group comprises:

determining whether there is the peer-to-peer direct connection between the endpoints grouped into the first group and the endpoints grouped into the second group based on the group and connection list.

4. The network traversal method according to claim 2 further comprising:

determining whether the number of endpoints using the peer-to-peer direct connection for communication is greater than a connection threshold, wherein when the number of endpoints using the peer-to-peer direct connection for communication is greater than the connection threshold, the peer-to-peer direct connection is not identified as the available connection.

5. The network traversal method according to claim 1, further comprising:

when there is no available connection, establishing a peer-to-peer direct connection between the first endpoint and the second endpoint is established by using a first connection mode, wherein the first connection mode includes a port prediction mode or a hole punching mode.

6. The network traversal method according to claim 5 further comprising:

reporting the peer-to-peer direct connection established between the first endpoint and the second endpoint to the on-line server.

7. The network traversal method according to claim 1, wherein the first NAT is a port restricted cone NAT or a symmetric NAT, and the second NAT is another symmetric NAT.

8. The network traversal method according to claim 1, wherein the second NAT is a port restricted cone NAT or a symmetric NAT, and the first NAT is another symmetric NAT.

9. A network communication system, comprising:

a plurality of NATs and a plurality of endpoints, wherein a first endpoint among the endpoints is inside a first NAT among the NATs, and a second endpoint among the endpoints is inside a second NAT among the NATs; and an on-line server, for grouping the endpoints, wherein the endpoints inside the first NAT are grouped into a first group, and the endpoints inside the second NAT are grouped into a second group, wherein the first endpoint determines whether there is an available connection between the endpoints grouped into the first group and the endpoints grouped into the second group, and when there is the available connection, the first endpoint establishes a connection between the first endpoint and the second endpoint by using the available connection, wherein the first endpoint determines whether the first NAT and the second NAT are respectively a full cone NAT, a restricted cone NAT, a port restricted cone NAT, or a symmetric NAT, wherein when the first NAT and the second NAT are respectively the full cone NAT, the restricted cone NAT, or the port restricted cone NAT, the first endpoint and the second endpoint establish a peer-to-peer direct connection between the first endpoint and the second endpoint by using a second connection mode, wherein when one of the first NAT and the second NAT is the symmetric NAT and another one of the first NAT and the second NAT is the full cone NAT or the restricted cone NAT, the first endpoint and the second endpoint establish the peer-to-peer direct connection between the first endpoint and the second endpoint by using the second connection mode, wherein the second connection mode includes a port prediction mode or a hole punching mode.

10. The network communication system according to claim 9, wherein the first endpoint determines whether there is a peer-to-peer direct connection between the endpoints grouped into the first group and the endpoints grouped into the second group, and when there is the peer-to-peer direct connection, the first endpoint sends a connection authorization request to the endpoints corresponding to the peer-to-peer direct connection, wherein when an approved acknowledgement response is received from the endpoints corresponding to the peer-to-peer direct connection, the first endpoint identifies the peer-to-peer direct connection as the available connection, and when the approved acknowledgement response is not received from or the connection authorization request is rejected by the endpoints corresponding to the peer-to-peer direct connection, the first endpoint does not identify the peer-to-peer direct connection as the available connection.

11. The network communication system according to claim 10, wherein the on-line server establishes a group and connection list to record the grouped endpoints and the peer-to-peer direct connection between the grouped endpoints, wherein the first endpoint determines whether there is the peer-to-peer direct connection between the endpoints grouped into the first group and the endpoints grouped into the second group based on the group and connection list.

12. The network communication system according to claim 10, wherein the endpoints corresponding to the peer-to-peer direct connection determine whether the number of endpoints using the peer-to-peer direct connection for communication is greater than a connection threshold, when the number of endpoints using the peer-to-peer direct connection for communication is greater than the connection threshold, the peer-to-peer direct connection is not identified as the available connection.

13. The network communication system according to claim 9, wherein when the first endpoint determines that there is no available connection, the first endpoint establishes a peer-to-peer direct connection between the first endpoint and the second endpoint by using a first connection mode, wherein the first connection mode includes a port prediction mode or a hole punching mode.

14. The network communication system according to claim 13, wherein the first endpoint and the second endpoint report the peer-to-peer direct connection established between the first endpoint and the second endpoint to the on-line server.

15. The network communication system according to claim 9, wherein the first NAT is a port restricted cone NAT or a symmetric NAT, and the second NAT is another symmetric NAT.

16. The network communication system according to claim 9, wherein the second NAT is a port restricted cone NAT or a symmetric NAT, and the first NAT is another symmetric NAT.

* * * * *